(12) United States Patent
Ho

(10) Patent No.: US 8,719,107 B2
(45) Date of Patent: May 6, 2014

(54) MACHINE-IMPLEMENTED METHOD FOR ASSISTING LABELING OF CORRECT PRODUCT SELLING PRICES

(75) Inventor: Wen-Kai Ho, Taipei Hsien (TW)

(73) Assignee: Wistron Corporation (TW)

( * ) Notice: Subject to any disclaimer, the term of this patent is extended or adjusted under 35 U.S.C. 154(b) by 1185 days.

(21) Appl. No.: 12/170,601

(22) Filed: Jul. 10, 2008

(65) Prior Publication Data

US 2009/0089179 A1    Apr. 2, 2009

(30) Foreign Application Priority Data

Oct. 2, 2007 (TW) ................................ 96136876 A

(51) Int. Cl.
   *G06Q 30/00* (2012.01)
(52) U.S. Cl.
   USPC ....................................... 705/26.1; 705/26.61
(58) Field of Classification Search
   None
   See application file for complete search history.

(56) References Cited

U.S. PATENT DOCUMENTS

| | | | |
|---|---|---|---|
| 6,076,070 A * | 6/2000 | Stack | 705/20 |
| 7,114,102 B2 | 9/2006 | Chan et al. | |
| 7,133,848 B2 | 11/2006 | Phillips et al. | |
| 7,853,473 B2 * | 12/2010 | Davis et al. | 705/7.31 |
| 2004/0249643 A1 | 12/2004 | Ouyang et al. | |

OTHER PUBLICATIONS

Taiwanese Office Action dated Sep. 14, 2011 issued in corresponding Taiwanese Patent Application No. TW96136876, 8 pages.

* cited by examiner

*Primary Examiner* — Paul Danneman
(74) *Attorney, Agent, or Firm* — Grossman Tucker Perreault & Pfleger PLLC

(57) ABSTRACT

In a machine-implemented method for assisting labeling of correct product selling prices on a shopping website, upon receipt of an input of a product name and a selling price of a product, a network interface program is enabled to search a specific shopping website for selling prices of related product items. An average selling price of the related product items thus located is found, and a determination as to whether a difference between the inputted product selling price and the average selling price is greater than a preset value is made. Acceptance of the inputted product selling price is refused and a warning message is issued if affirmative. The inputted product selling price is accepted and stored if otherwise. Accordingly, an operator of the shopping website can be assisted to detect pricing errors so as to prevent labeling of incorrect product selling prices due to oversight.

12 Claims, 3 Drawing Sheets

MACHINE-IMPLEMENTED METHOD FOR ASSISTING LABELING OF CORRECT PRODUCT SELLING PRICES

CROSS-REFERENCE TO RELATED APPLICATION

This application claims priority of Taiwanese Application No. 096136876, filed on Oct. 2, 2007.

BACKGROUND OF THE INVENTION

1. Field of the Invention

The invention relates to a method for inputting product selling prices, more particularly to a machine-implemented method for assisting labeling of correct product selling prices on a shopping website.

2. Description of the Related Art

Due to the fast development of the Internet and the relative ease to establish network connections, shopping websites that operate on the Internet have become very popular, and consumers enjoy the fun of shopping on-line without physically going to a store.

Since a shopping website in general displays images of products sold in conjunction with descriptions of the products to serve as a reference for consumers, which is unlike physical shops that have shopkeepers or sales personnel to answer inquiries of consumers, the prices of virtually all the products sold on a shopping website are displayed on the shopping website for reference by the consumers. Therefore, an operator of the shopping website generally needs to input relevant product information at a server of the shopping website. Because the product information (including product selling prices) is inputted manually, human errors are inevitable. Pricing errors may result in an influx of orders from consumers if the prices are unreasonably low or a lack of orders if the prices are unreasonably high. In the former case, the shopping website will suffer monetary losses. In the latter case, the concerned product will not sell well.

Therefore, if the selling price of a product sold on the shopping website can be compared with products of the same kind sold on other shopping websites during inputting of the selling price of the product, it would help the operator of the shopping website detect pricing errors to thereby eliminate the aforesaid undesirable scenarios in which there is an unusually large amount of orders received for a particular product or a lack of orders.

SUMMARY OF THE INVENTION

Therefore, the object of the present invention is to provide a machine-implemented method for assisting labeling of correct product selling prices on a shopping website so as prevent input of an incorrect product selling price by an operator of the shopping website.

Accordingly, the machine-implemented method for assisting labeling of correct product selling prices on a shopping website of this invention includes:

(A) receiving a product name and a product selling price of a product inputted by an operator of the shopping website;

(B) searching a specific shopping website to locate selling prices of related product items related to the inputted product name;

(C) averaging located selling prices so as to obtain an average selling price; and (D) determining whether a difference between the inputted product selling price and the average selling price is greater than a preset value, refusing to accept the inputted product selling price if affirmative, and accepting the inputted product selling price if otherwise.

Preferably, in step (A), the product name and the product selling price inputted are received by a network interface program having an input module.

Preferably, in step (B), a network interface program having a search module is used to connect to a specific search engine so as to search the specific shopping website for URLs of the related product items on the specific shopping website and so as to subsequently obtain the selling prices of the related product items from web pages at the located URLs.

Preferably, the search engine is Google, and the search module is provided by Google.

Preferably, the search engine is Yahoo, and the search module is provided by Yahoo.

Preferably, the selling prices of the related product items located in step (B) are displayed via a network interface program having a display module so as to allow the operator of the shopping website to delete the selling prices of any unsuitable product items, step (C) being executed after receiving a confirmation from the operator.

Preferably, step (D) is executed by a comparison module of the network interface program.

Preferably, in step (D), the comparison module determines whether the difference between the inputted product selling price and the average selling price is greater than the preset value, acceptance of the inputted product selling price being refused if affirmative and a warning message being issued through the display module of the network interface program, the inputted product selling price being accepted and stored if otherwise.

Preferably, the difference is a percentage value obtained by dividing an absolute value of a difference between the inputted product selling price and the average selling price by the inputted product selling price, and the preset value is a price difference percentage value preset by the network interface program.

Preferably, the machine-implemented method of the present invention further includes a step (E) after step (D): enabling the display module to display the located selling prices and the related product items while issuing the warning message, enabling the comparison module to determine whether a portion of the related product items and the selling prices thereof has been deleted, the selling prices of the remaining related product items being re-averaged so as to obtain a new average selling price, and step (D) being repeated thereafter if affirmative, whether the inputted product selling price has been changed or whether a new product selling price for the product has been inputted being determined if otherwise, wherein step (D) is repeated if affirmative and the display module continues to issue the warning message if otherwise.

Preferably, the machine-implemented method of the present invention further includes a step (E) after step (D): determining whether the inputted product selling price has been changed or whether a new product selling price for the product has been inputted, step (D) being repeated if affirmative.

Preferably, the machine-implemented method of the present invention further includes a step (E) after step (D): while the display module issues the warning message enabling the comparison module to determine whether the inputted product selling price has been changed or whether a new product selling price for the product has been inputted, step (D) being repeated if affirmative, the display module continuing to issue the warning message if otherwise.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
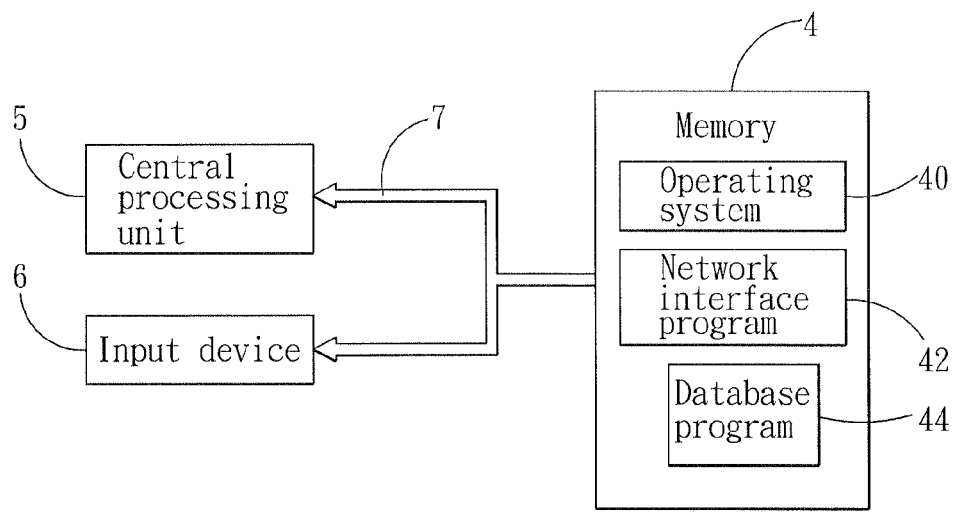
FIG. 1 illustrates a system architecture for implementing the machine-implemented method of this invention.

Referring to FIG. 1, a system to implement the machine-implemented method for assisting labeling of correct product selling prices on a shopping website according to this invention includes a memory 4, which stores an operating system 40, a network interface program 42, and a database program 44. In addition, the system further includes a central processing unit 5, an input device 6 (such as a keyboard), and a bus 7. The memory 4, the central processing unit 5, and the input device 6 are interconnected through the bus 7.

Software program for constructing the shopping website is constituted by the database program 44 and the network interface program 42.

An operator of the shopping website can use the input device 6 (such as a keyboard) to add or edit product data, put product items on or off shelves, handle purchase orders, etc.

Figure 2:
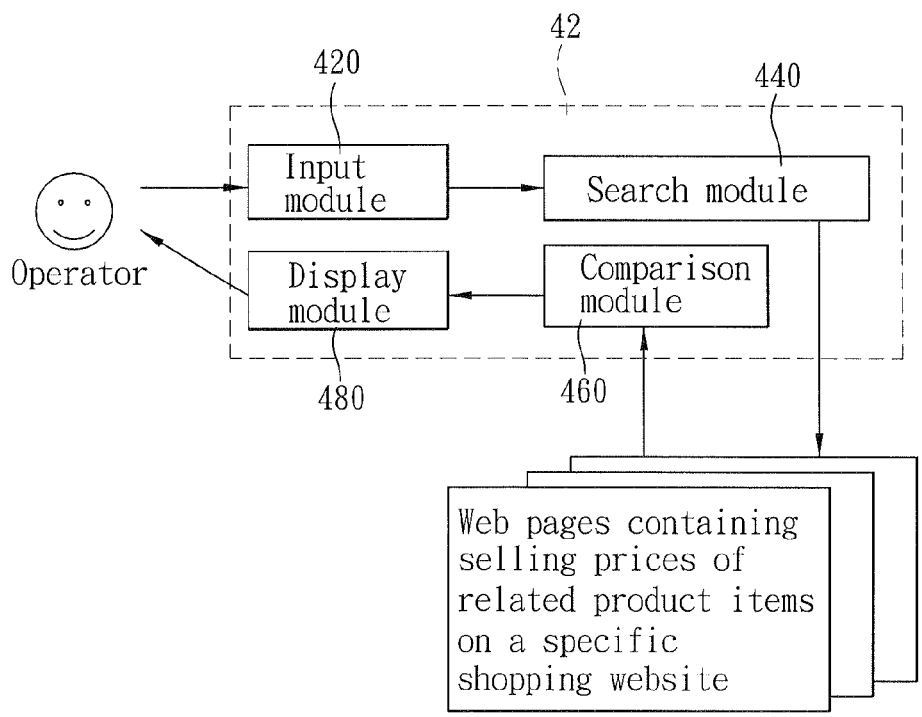
FIG. 2 is a schematic diagram to illustrate a program module included in a network interface program in the first preferred embodiment of a machine-implemented method for assisting labeling of correct product selling prices on a shopping website according to the present invention.

To prevent the operator of the shopping website from inadvertently inputting incorrect product selling prices when entering product data via the database program 44, as shown in FIG. 2, the first preferred embodiment of a machine-implemented method for assisting labeling of correct product selling prices on a shopping website according to this invention is realized by a software program. The software program includes the following steps.

Referring to FIG. 2, the software program for assisting labeling of correct product selling prices on a shopping website includes the network interface program 42 (e.g., an Application Programming Interface (API) provided by a search engine, such as Google or Yahoo) pre-installed in the system. The network interface program 42 includes an input module 420, a search module 440, a comparison module 460, and a display module 480.

Figure 3:
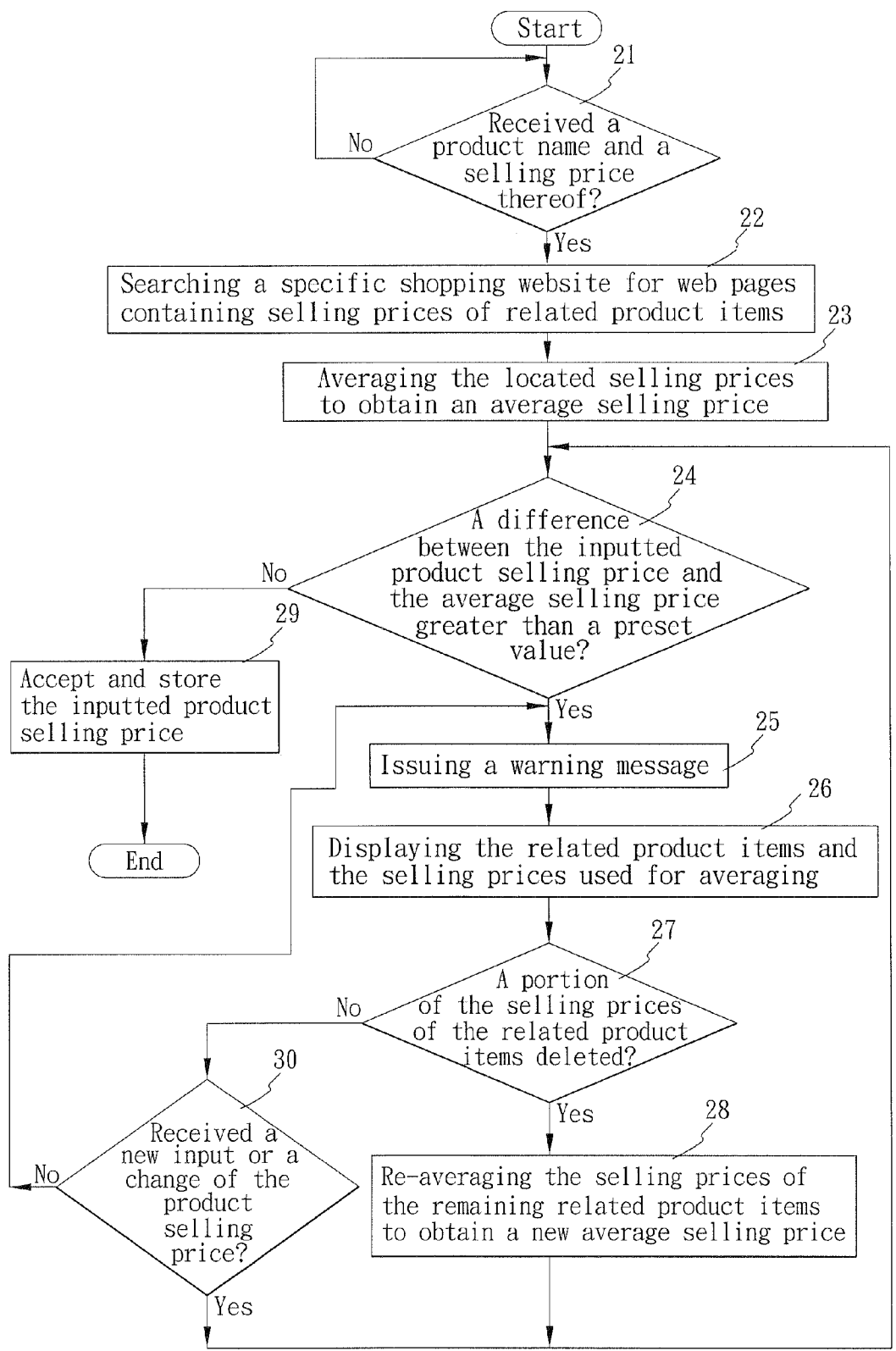
FIG. 3 is a flowchart of the first preferred embodiment.

Referring to FIG. 3, in step 21, the product name of a product, e.g., Nokia N95 cell phone, and a selling price of the product are received from the operator of the shopping website via the input device 6. In step 22, the input module 420 of the network interface program 42 automatically sets the product name, Nokia N95 cell phone, and the name of a specific shopping website, e.g., PC Home, as search keywords, and sends the set keywords to the search module 440. Based on the set keywords, the search module 440 searches the specific shopping website (PC Home) for web pages containing selling prices of related product items, and sends URLs of located web pages to the comparison module 460. The comparison module 460 obtains information of names and selling prices of the related product items from the located web pages, and transmits the information to the display module 480.

In step 23, the comparison module 460 averages the selling prices of the related product items located in the search to obtain an average selling price, and determines whether a difference between the product selling price inputted by the operator of the shopping website and the average selling price is greater than a preset value. Preferably, the preset value is a tolerable price difference percentage value, and the determination is made by subtracting the average selling price from the inputted product selling price to find a difference, obtaining an absolute value of the difference, dividing the difference by the inputted product selling price to obtain a price difference percentage value, and determining whether the price difference percentage value is greater than the preset value. If the price difference percentage value is greater than the preset value, in step 25, the comparison module 460 notifies the display module 480 to issue a warning message through a computer screen or a speaker, for example, so as to notify the operator of the shopping website that the product selling price inputted thereby may be incorrect. At the same time, in step 26, the display module 480 displays the related product items and the selling prices used for averaging in step 23 for viewing by the operator so as to allow the operator to identify any unsuitable product items that should not have been included in the averaging step, e.g., a peripheral product associated with Nokia N95 but is not the cell phone Nokia N95. The operator of the shopping website can then delete the selling prices of the unsuitable product items through the network interface program 42.

In step 27, if the comparison module 460 determines a deletion of any of the displayed selling prices of the related product items, the comparison module 460 will re-average the selling prices of the remaining related product items in step 28 to obtain a new average selling price. The flow then returns to the aforesaid step 24 to re-determine whether the product selling price inputted by the operator is correct based on the new average selling price.

If the price difference percentage value found in step 24 is smaller than the preset value, the comparison module 460 will determine that the product selling price inputted by the operator is correct, and step 29 is executed, in which the inputted product selling price is accepted and stored in the memory 4 to be displayed as a part of the product data for browsing by prospective customers on the Internet.

When the comparison module 460 determines no deletion of the selling prices of the related product items in step 27, step 30 is executed to determine whether there is a new input or a change of the product selling price. If yes, step 24 is executed to determine whether the inputted product selling price is correct. Otherwise, step 25 is executed to cause the display module 480 to continue to issue the warning message.

It is apparent from the foregoing that, by comparing the inputted product selling price with an average selling price of the same products (or products within the same category) sold on a specific shopping website, the present invention can assist operators of shopping websites to detect pricing errors, thereby eliminating undesirable scenarios in which unusually large or small amounts of orders are received for a particular product due to input of incorrect selling prices.

Figure 4:
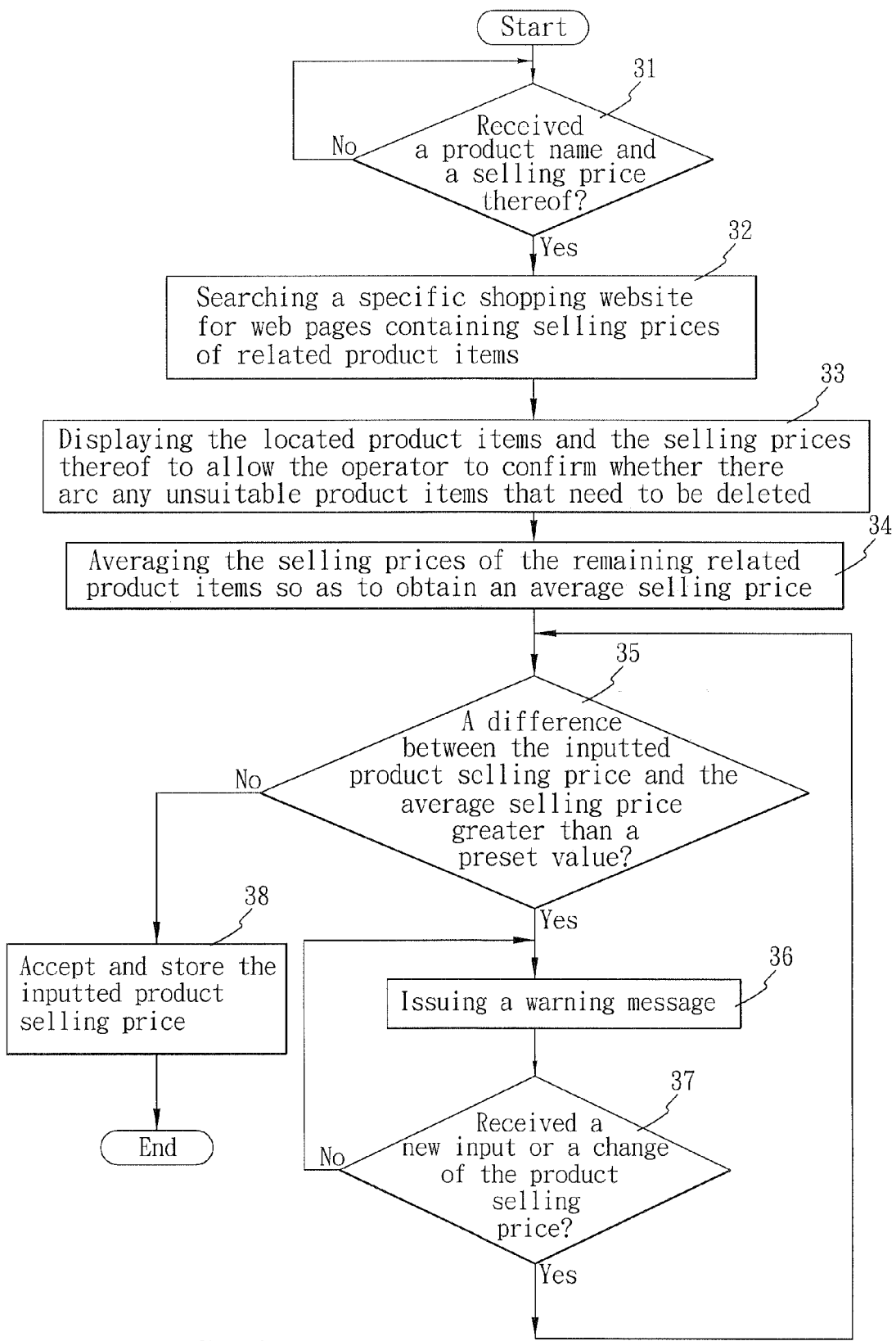
FIG. 4 is a flowchart of the second preferred embodiment of a machine-implemented method for assisting labeling of correct product selling prices on a shopping website according to the present invention.

Referring to FIGS. 2 and 4, the second preferred embodiment of a machine-implemented method for assisting labeling of correct product selling prices on a shopping website according to this invention is realized by a software program that includes the following steps:

Initially, steps 31 and 32 which are identical to the aforesaid steps 21 and 22 in the first preferred embodiment are executed. Upon receipt of an input of a product name and a product selling price from the operator of the shopping website, the input module 420 transmits the inputted product name and product selling price to the search module 440. The search module 440 then searches web pages of a specific shopping website for selling prices of identical or similar product items. In step 33, the search module 440 sends information of the related product items thus located and the selling prices thereof to the display module 480 for viewing by the operator of the shopping website. The operator of the shopping website can then delete any product items and the associated selling prices that are unsuitable for comparison. Upon receipt from the operator of a confirmation to proceed with the price comparing procedure, the comparison module 460 executes step 34 to obtain an average of the selling prices of the related product items so as to compute an average selling price of the related product items. Step 35 (identical to the aforesaid step 24) is then executed to determine whether a difference between the inputted product selling price and the average selling price is greater than a preset value. If yes, step 36 (identical to the aforesaid step 25) is executed to enable the display module 480 to issue a warning message. Subsequently, in step 37, the comparison module 460 determines whether there is a new input or a change of the product selling price by the operator. If yes, step 35 is executed to determine whether a difference between the newly inputted product selling price and the average selling price is greater than the preset value. Otherwise, step 36 is executed to cause the display module 480 to continue to issue the warning message. If the inputted product selling price is determined to be correct by the comparison module 460 of the network interface program 42 in step 35, step 38 is executed, in which the comparison module 460 accepts the inputted product selling price and stores the same in the memory 4.

It is thus apparent from the foregoing description that the second preferred embodiment differs from the first preferred embodiment in that, in the second preferred embodiment, prior to obtaining an average selling price, information of the related product items and the selling prices thereof are displayed to the operator of the shopping website to allow the operator to delete any unsuitable product items so as to obtain a more accurate average selling price for comparison with the inputted product selling price, thereby obtaining a more accurate determination result. In the first preferred embodiment, an average selling price is directly obtained from the selling prices of the related product items, and the related product items and the selling prices thereof are displayed to the operator of the shopping website upon the issuance of the warning message so as to allow the operator to detect any unsuitable product items that may affect the average selling price before making a new comparison. Although there are slight differences between the first and second preferred embodiments, both of the first and second preferred embodiments can achieve the intended object of assisting operators of shopping websites to input correct product selling prices.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A machine-implemented method for assisting labeling of correct product prices on a shopping website, said method to be implemented by a system that includes a central processing unit, and comprising:

(A) receiving, by the central processing unit, a product name and a product selling price of a product, wherein the central processing unit receives the product name and the product selling price from an input device when the input device is operated by a proprietor of the shopping website to enter the product name and the product selling price;

(B) searching, by the central processing unit, a specific shopping website to locate selling prices of related product items related to the product name received in step (A);

(C) averaging, by the central processing unit, selling prices located in step (B) so as to obtain an average selling price;

(D) determining, by the central processing unit, whether a difference between the product selling price received in step (A) and the average selling price is greater than a preset value; and (E) when the central processing unit determines that the difference is greater than the preset value, which indicates that the product selling price received in step (A) is an incorrectly entered product selling price, refusing, by the central processing unit, to accept the product selling price received in step (A).

2. The machine-implemented method for assisting labeling of correct product selling prices on a shopping website according to claim 1, wherein the product name and the product selling price entered in step (A) are received through an input module of a network interface program executed by the central processing unit.

3. The machine-implemented method for assisting labeling of correct product prices on a shopping website according to claim 1, wherein, in step (B), a search module of a network interface program executed by the central processing unit is used to connect to a specific search engine so as to search the specific shopping website for URLs of the related product items on the specific shopping website and so as to subsequently obtain the selling prices of the related product items from web pages at the located URLs.

4. The machine-implemented method for assisting labeling of correct product selling prices on a shopping website according to claim 3, wherein the search engine is Google, and the search module is provided by Google.

5. The machine-implemented method for assisting labeling of correct product selling prices on a shopping website according to claim 3, wherein the search engine is Yahoo, and the search module is provided by Yahoo.

6. The machine-implemented method for assisting labeling of correct product selling prices on a shopping website according to claim 1, wherein the selling prices of the related product items located in step (B) are displayed via a display module of a network interface program executed by the central processing unit so as to allow the proprietor of the shopping website to delete the selling prices of any unsuitable product items, step (C) being executed after receiving a confirmation from the proprietor.

7. The machine-implemented method for assisting labeling of correct product selling prices on a shopping website according to claim 6, wherein step (D) is executed by a comparison module of the network interface program.

8. The machine-implemented method for assisting labeling of correct product selling prices on a shopping website according to claim 7, wherein, in step (E), the display module of the network interface program is configured to issue a warning message if the difference is greater than the preset value.

9. The machine-implemented method for assisting labeling of correct product selling prices on a shopping website according to claim 8, wherein the difference is a percentage value obtained by dividing an absolute value of a difference between the product selling price received in step (A) and the average selling price by the product selling price received in step (A), and the preset value is a price difference percentage value preset by the network interface program.

10. The machine-implemented method for assisting labeling of correct product selling prices on a shopping website according to claim 8, further comprising:
(F) enabling the display module to display the located selling prices and the related product items while issuing the warning message, and enabling the comparison module to determine whether a portion of the related product items and the selling prices thereof has been deleted, the selling prices of the remaining related product items being re-averaged so as to obtain a new average selling price; and
(G) after step (F), repeating step (D).

11. The machine-implemented method for assisting labeling of correct product selling prices on a shopping website according to claim 8, further comprising: (F) while the display module of the network interface program issues the warning message, enabling the comparison module to determine whether the product selling price received in step (A) has been changed or whether a new product selling price for the product has been inputted, wherein step (D) is repeated if affirmative, and the display module continues to issue the warning message if otherwise.

12. The machine-implemented method for assisting labeling of correct product selling prices on a shopping website according to claim 1, further comprising:
(F) determining, by the central processing unit, whether the product selling price received in step (A) has been changed or whether a new product selling price for the product has been inputted, wherein step (D) is repeated if affirmative.

* * * * *